(12) United States Patent
Lee et al.

(10) Patent No.: US 6,400,750 B1
(45) Date of Patent: Jun. 4, 2002

(54) BASE STATION SYSTEM AND DATA TRANSMISSION METHOD OF MULTICARRIER CDMA/FDM HYBRID SYSTEM AND MOBILE COMMUNICATION SYSTEM USING SAME

(75) Inventors: Dong-Wook Lee; Duck-Bin Im, both of Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/205,568

(22) Filed: Dec. 4, 1998

(30) Foreign Application Priority Data

Oct. 1, 1998 (KR) .......................................... 98-41475

(51) Int. Cl.[7] .............................................. H04L 27/30
(52) U.S. Cl. ........................ 375/130; 375/146; 375/147; 375/150; 455/442
(58) Field of Search ................................ 375/130, 146, 375/147, 144, 149, 150; 370/252, 335; 455/442

(56) References Cited

U.S. PATENT DOCUMENTS

| | | | | |
|---|---|---|---|---|
| 5,521,937 | A | 5/1996 | Kondo et al. ................ | 375/144 |
| 5,729,570 | A | 3/1998 | Magill ......................... | 375/149 |
| 6,175,736 | B1 * | 1/2001 | Lee et al. .................... | 455/442 |
| 6,269,113 | B1 * | 7/2001 | Park ............................ | 375/146 |
| 6,282,232 | B1 * | 8/2001 | Fleming, III et al. ....... | 375/147 |

OTHER PUBLICATIONS

Performance of Multicarrier DS CDMA Systems; Shiro Kondo and Laurence B. Milstein; Feb. 1996; pp. 238–246.
Multicarrier Modulation for Data Transmission: An Idea Whose Time Has Come; John A.C. Bingham; May 1990; pp. 5–14.

* cited by examiner

*Primary Examiner*—Stephen Chin
*Assistant Examiner*—Shuwang Liu
(74) *Attorney, Agent, or Firm*—Antonelli, Terry, Stout & Kraus, LLP

(57) ABSTRACT

A base station system of a multicarrier CDMA and a data transmission method and a mobile communication system using the same are disclosed. The system includes a base station control apparatus connecting with an exchange, a pilot signal modulation apparatus for generating a spread spectrum modulated pilot signals as many as the number of carriers in accordance with a control of the base station control apparatus, a paging signal modulation apparatus for generating a spread spectrum modulated paging signals as many as the number of carriers in accordance with a control of the base station control apparatus, a plurality of traffic signal modulation apparatuses for generating a spread spectrum modulated traffic signals as many as the number of carriers in accordance with a control of the base station control apparatus, a plurality of combiners provided as many as the number of the carriers for combining input signals from the modulation apparatuses, and a radio frequency transmission apparatus for modulating the outputs from the combiners into multiple radio frequencies and transmitting the same, for thereby controlling a lot number of mobile stations by distinguishing the mobile station signals using an orthogonal codes at a link from a base station to a terminal in the multicarrier CDMA cellular system and removing a interference between the mobile stations in the same cell.

12 Claims, 2 Drawing Sheets

BASE STATION SYSTEM AND DATA TRANSMISSION METHOD OF MULTICARRIER CDMA/FDM HYBRID SYSTEM AND MOBILE COMMUNICATION SYSTEM USING SAME

BACKGROUND OF THE INVENTION

1. Field of the Invention

The present invention relates to a base station system, a data transmission method of a multicarrier CDMA/FDM hybrid system, and a mobile communication system using the same, and in particular to an improved base station system, data transmission method, and a mobile communication system using the same which are capable of increasing the number of mobile stations supported in a cell when using a multicarrier CDMA method by differently setting a modulation mode of a traffic signal in accordance with the number of the mobile stations in a cell.

2. Description of the Conventional Art

The multicarrier CDMA system and data transmission method is disclosed in the U.S. Pat. No. 5,521,937 entitled "Multicarrier direct sequence spread system and method". In the patent, the DSSS(Direct Sequence Spread Spectrum) in which the spectrum of a user data is spread using a PN(Pseudo noise) code is transmitted to various different frequency channels, a receiver receives the signals at each frequency channel and then combines the received signals for thereby demodulating it. In this mobile communication receiver, it is possible to obtain a combining gain and signal processing gain from the diversity of channel characteristics the frequency channels.

FIG. 1 illustrates a base station system supporting a K mobile stations and using four carrier waves in the mobile communication system using the multicarrier CDMA method.

In the drawings, reference numeral 102 represents an exchange, 104 represents a base station system, 106 represents a base station control apparatus, 108 represents a pilot signal modulation apparatus, 110 represents a paging signal modulation apparatus, 112-1 through 112-K represent traffic signal modulation apparatuses, 114-1 through 1144 represent combining units, 116-1 through 116-4 represent BPSK (Binary Phase Shift Keying) modulators, 118 represents a radio frequency(RF) combining unit, 120 represents an amplifier, and 122 represents an antenna.

The exchange 102 communicates with the base station control apparatus 106 in the base station 104. The base station control apparatus 106 controls the pilot up signal modulation apparatus using a CDMA/FDM(Frequency Division Multiplexing), the paging signal modulation apparatus 110 and the K number of the traffic signal modulation apparatuses 112-1 through 112-K.

The pilot signal modulation apparatus 108 outputs the first, second, third and fourth signals, which are the same pilot pseudo noise (PN) code.

The paging signal modulation apparatus 110 outputs the first, second, third and fourth paging signals, which are the same paging spread spectrum signals. Here, the paging spread spectrum signal is obtained by multiplying the paging information data bit inputted from the base station control apparatus and the paging PN code.

In the K-number of the traffic signal modulation apparatuses 112-1 through 112-K, four traffic spread spectrum signals are generated by multiplying the four user data bits and the traffic PN code in parallel, and four spread spectrum signals are output to first, second, third and fourth traffic signals.

The first through fourth combiners 114-1 through 114-4 sum the first through fourth pilot, paging, and the K number of the traffic signals, respectively.

The first through fourth BPSK modulators 116-1 through 1164 modulate the outputs of combiners 114-1 through 114-4 to the radio frequency using the frequencies $f_1$, $f_2$, $f_3$. The RF(Radio Frequency) modulated by the first through fourth BPSK modulators 116-1 through 116-4 are combined by the RF combiner 118. In addition, the output from the RF combiner 118 is amplified by the amplifier 120 and is transmitted through the antenna 122.

When the frequency transmitted through the antenna 122 is received at a predetermined terminal, the terminal converts each spread spectrum signal received in a carrier frequency into a base band frequency. The codes allocated to the terminal are multiplied and despread. In addition, the above-described terminal combines the despread signals using a maximal-ratio combiner for thereby demodulating the user data.

Here, the pilot signal modulation apparatus 108 and the first through fourth BPSK modulators 116-1 through 1164 are the elements of the multicarrier pilot signal modulation apparatus. The paging signal modulation apparatus 110 and the first through fourth BPSK modulators 116-1 through 1164 are the elements of the multicarrier paging modulation apparatus. The traffic signal modulation apparatuses 112-1 through 112-K and the first through fourth BPSK modulators 116-1 through 116-4 are the elements of the multicarrier signal modulation apparatus.

In the mobile communication system of the multicarrier CDMA, the number of code chips per data bit is reduced by the number of the carriers compared to the mobile communication system of a single carrier CDMA using the identical bandwidth. In the cellular mobile phone system of the CDMA, orthogonal codes are used for distinguishing mobile stations at the link from the base station to the mobile station. The number of orthogonal codes is the same as the number of the code chips per data bit.

Therefore, the number of the codes for distinguishing the mobile stations which may be used for the mobile communication system of the multicarrier CDMA is reduced by times the number of the carriers compared to the single carrier mobile communication system using the identical bandwidth.

In the mobile communication system of the multicarrier CDMA using four carrier frequencies having the construction as shown in FIG. 1, the number of the code chips per data bit is reduced by ¼ compared to the mobile communication system of the single carrier method.

Therefore, the number of the orthogonal codes which may be allocated to each mobile station is reduced by ¼ as well. In the base station of the mobile communication system of the multicarrier method, in order to support the same number of the mobile stations as the number of the mobile stations which may be used in the base station of the mobile communication system using the single carrier method, the code allocated to each mobile station should be a code which is not orthogonal to each other. Namely, a quasi-orthogonal functions or a random sequence should be used instead of the orthogonal function for distinguishing the mobile stations. However, if the quasi-orthogonal function or the random sequence is used, since the interference between the mobile stations in the same cell is increased, the bit error rate is increased for thereby degrading the performance of the system.

SUMMARY OF THE INVENTION

Accordingly, it is an object of the present invention to provide a base station system and a data transmission method of a multicarrier CDMA/FDM hybrid system and a mobile communication system using the same which overcome the aforementioned problems encountered in the conventional art.

It is another object of the present invention to provide a base station system of a multicarrier CDMA, a data transmission method and a mobile communication system using the same which are capable of controlling a lot number of mobile stations by distinguishing the mobile stations using orthogonal codes at a link from a base station to a terminal of a cellular system using the multicarrier CDMA and removing interference from signals transmitted to the other mobile stations in the same cell.

In order to achieve the above objects, there is provided a base station system which includes a base station control apparatus connecting with an exchange, a pilot signal modulation apparatus for generating a spread spectrum modulated pilot signal as many as the number of carriers in accordance with a control of the base station control apparatus, a paging signal modulation apparatus for generating spread spectrum modulated paging signals as many as the number of carriers in accordance with a control of the base station control apparatus, a plurality of traffic signal modulation apparatuses, each of which generates spread spectrum modulated traffic signals as many as the number of carriers in accordance with a control of the base station control apparatus, a plurality of combiners provided as many as the number of the carriers for combining input signals from the modulation apparatuses, and a radio frequency transmission apparatus for modulating the outputs from the combiners into a radio frequency and transmitting the same, wherein said base station control apparatus determines the modulation mode in accordance with the number of mobile stations in a cell, and the determined modulation mode is contained into the paging signal and then is transmitted, and the traffic signal modulation apparatus is controlled in accordance with the determined modulation mode, and wherein said traffic signal modulation apparatus symbol-repeats the user data bits for a predetermined time in accordance with the modulation mode determined by the base station control apparatus and modulates a plurality of carriers using a traffic spread spectrum signal obtained by multiplying the symbol-repeated user data bit with a data bit which is serial/parallel-converted as many as the carriers and the traffic pseudo noise code.

In order to achieve the above objects, there is provided a data transmission method for a mobile communication system using a multicarrier method which includes a first step for determining a modulation mode in accordance with the number of the mobile stations in a cell in the base station control apparatus, a second step for performing a spread spectrum modulation with respect to a paging information including the determined modulation mode, a pilot information and a traffic information as many as the number of the carriers, a third step for modulating the radio frequency signal including the spread spectrum modulated paging signal, the pilot signal and a plurality of traffic signal by each carrier and transmitting the same to the mobile station, a fourth step for detecting a code phase of the receiving signal and an information with respect to the carrier phase from the pilot signal received from the mobile station, and a fifth step for classifying the modulation mode used in the base station from the paging signal received by the mobile station and demodulating the received traffic signal using the detected phase information and the modulation mode, wherein traffic information modulation step, the user data bit is symbol-repeated for a predetermined times in accordance with the determined modulation mode, and a plurality of carriers are modulated using a traffic spread spectrum signal obtained by multiplying the serial/parallel converted data bit and the traffic pseudo noise code as many as the number of the carriers with respect to the symbol-repeated user data bits.

In order to achieve the above objects, there is provided a mobile communication system which includes a base station control means for determining a modulation mode in accordance with the number of mobile stations in a cell, for including the determined modulation mode into a paging signal and for controlling a spread spectrum modulation in accordance with the determined modulation mode, a pilot signal modulation means for generating a spread spectrum modulated pilot signal as many as the number of the carriers in accordance with a control of the base station control means, a paging signal modulation means for generating the spread spectrum modulated paging signal in accordance with a control of the base station control means, a traffic signal modulation means for symbol-repeating the user data bit for a predetermined times in accordance with the modulation mode determined by the base station control means and for generating traffic spread spectrum signal obtained by multiplying the symbol-repeated, serial/parallel converted data bits and the traffic pseudo noise code, a plurality of combining means provided at many as the carriers for combining the signals inputted from the modulation means, and a radio frequency transmission means for modulating the output signals from the combining means to the radio frequencies, and said mobile station comprising a pilot signal receiving means for detecting a code phase and a plurality of carrier phases of the signal transmitted from the base station, an information receiving means for demodulating the paging signal and the traffic signal received from the base station, and a mobile station control means for controlling the pilot signal receiving means and the information receiving means, detecting the modulation mode from the paging information demodulated by the information receiving means and demodulating the traffic signal using the detected phase information and the modulation mode.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims as a result of the experiment compared to the conventional arts.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
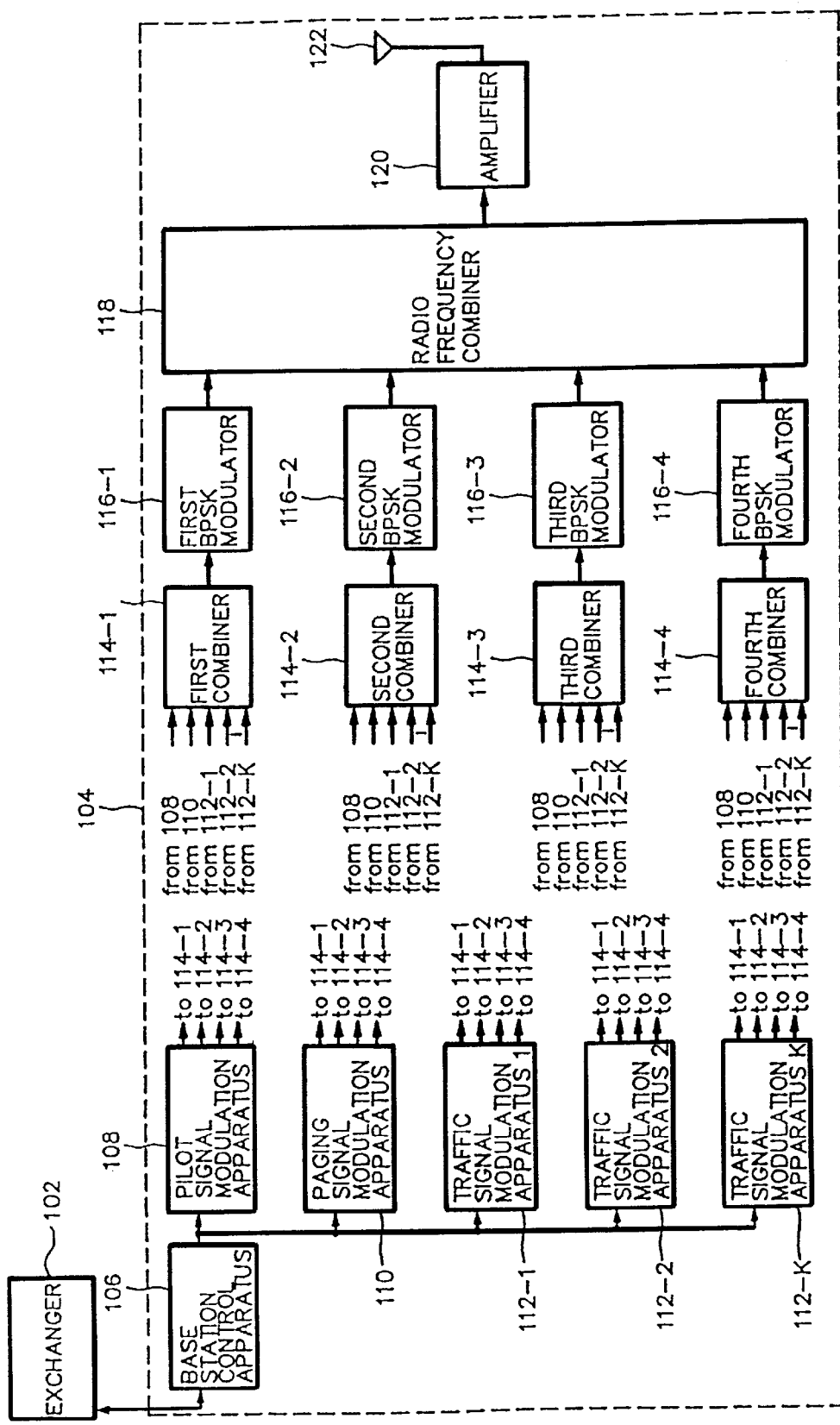
FIG. 1 is a block diagram illustrating a base station system of a multicarrier CDMA method.

The embodiments of the present invention will be explained with reference to the accompanying drawings.

If a user data inputted from a bast station control apparatus 106 is converted into 1:4 by a serial-parallel conversion, the data transmit rate at one carrier frequency is decreased by ¼. Therefore, the number of the code chips per data bit may be increased four times for one frequency. In this case, it is impossible to obtain a signal-to-noise ratio gain obtaining from the diversity of channel characteristics at different frequencies. Therefore, in the present invention, another modulation method may be adapted for a user who wants a new call set-up in accordance with the number of users.

First, when the base station control apparatus receives a cell set-up request from the exchange, the traffic signal modulation mode is included into a paging information data bit and then is transmitted. Here, the traffic signal modulation mode is determined in accordance with the number of users who currently use the system or the average number of the suers for a predetermined period. Namely, in the base station control apparatus, if the number of the users is below a predetermined number, the known multicarrier transmission mode is used. Otherwise, the hybrid transmission mode of the present invention is used. The traffic signal modulation mode determined by the base station control apparatus is inputted into the traffic signal modulation apparatus.

The traffic signal modulation apparatus modulates a plurality of carriers using the traffic spread spectrum signal obtained by multiplying the user data bit and the traffic pseudo noise code, In accordance with the traffic signal modulation mode inputted from the base station control apparatus, the multicarrier transmission mode or the hybrid transmission mode is performed. Here, in the multicarrier transmission mode, a plurality of carriers are modulated by the same traffic spread spectrum signal which is obtained by multiplying the user data bit and the pseudo noise code, and, as a result, the same data bits are transmitted via multiple frequency channels. In addition, in the hybrid transmission mode, the user data bits are serial-to-parallel converted, when the number of parallel branches is that of carriers. Each of a plurality of carriers is modulated by a traffic spectrum spreading signal obtained by multiplying one of the output of the serial-to-parallel converter and the traffic pseudo noise code. The number of the pseudo node code chips per each output data bit of the serial-parallel converter is increased by the number of the carriers compared to the multicarrier transmission mode.

The operation of the mobile station will be explained. The pilot receiver of the mobile station detects the code phase and the carrier phases of the received signal from the pilot signal transmitted from the base station. The information receiver of the mobile station demodulates a paging signal which is a call set-up information bit. In addition, the control apparatus of the mobile station receives the code phase and phases of the multiple carriers from the pilot receiver, and inputs them into the information receiver. In a state that the mobile station does not perform the call set-up, the information receiver is controlled to continuously demodulate the paging signal.

In addition, when the call set-up information is received from the information receiver, the information receiver is controlled to demodulate the user data bit. At this time, the mobile station control apparatus obtains the information of the traffic signal modulation mode from the call set-up information in the paging signal, and controls the information receiver. Namely, if the traffic signal modulation mode is the multicarrier transmission mode, the mobile station control apparatus controls the information receiver to demodulate after combining the signals received from all the frequencies. If the traffic signal modulation mode is a hybrid transmission mode, the information receiver is controlled to demodulate the signals received from each carrier frequency. In addition, in the hybrid transmission mode, the identical data may be transmitted as a few carriers. (For example, the identical data may be modulated for two carriers of four carriers.)

The operation of the spread spectrum modulation apparatus of the base station will be explained with reference to FIG. 2.

Figure 2:
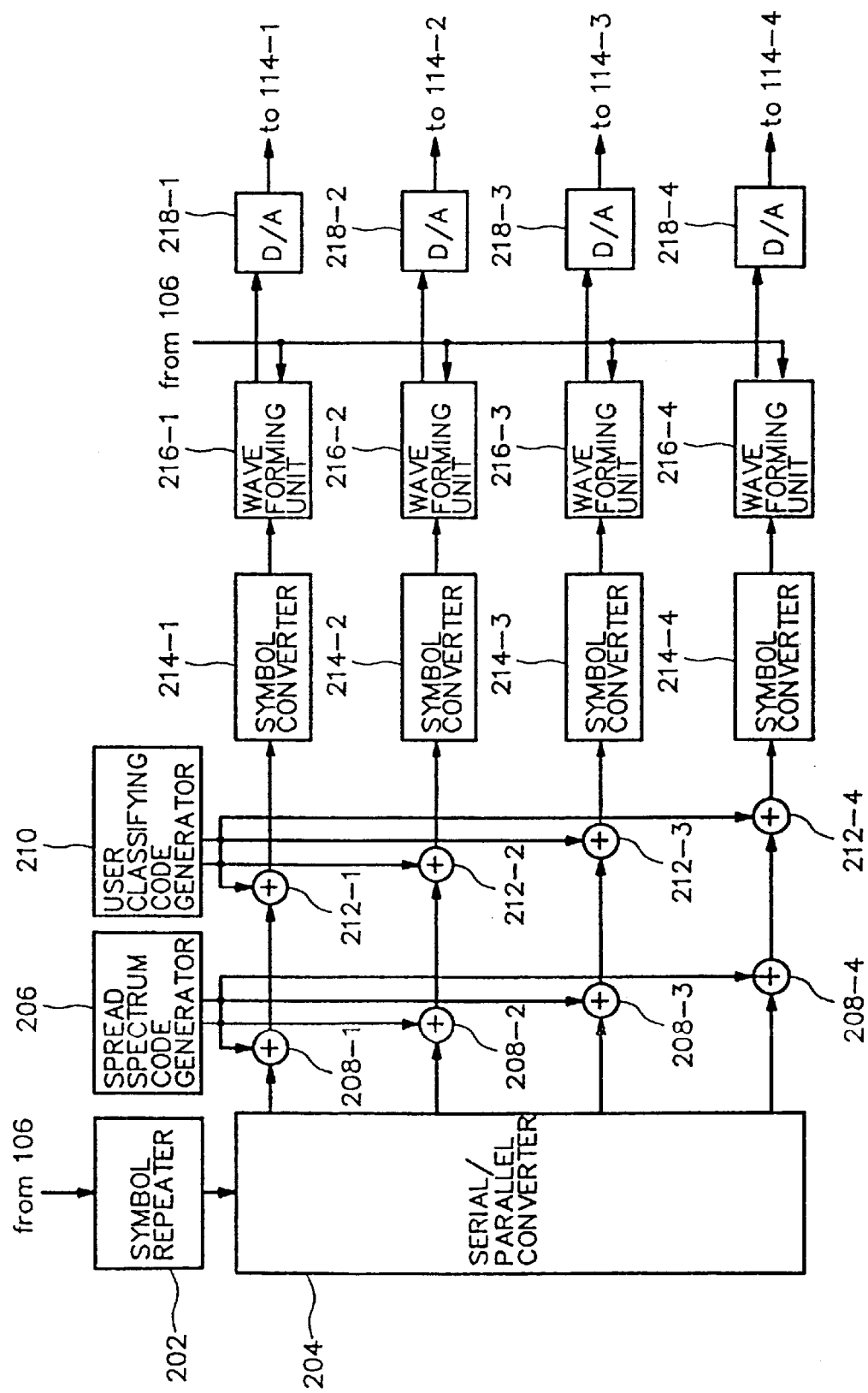
FIG. 2 is a block diagram illustrating a spreading code modulation apparatus according to the present invention.

FIGS. 2 illustrates the spread spectrum modulation apparatus according to the present invention. In the drawings, reference numeral 202 represents a symbol repeater, 204 represents a serial/parallel converter, 206 represents a spread spectrum code generator, 208-1 through 208-4 and 212-1 through 212-4 represent combiners, 210 represents a user code generator, 214-1 through 214-4 represents a symbol converter (mapper), 216-1 through 2164 represent a wave forming unit, and 218-1 through 218-4 represents a D/A converter.

When a user data is inputted through the base station control apparatus (reference numeral 106 in FIG. 1), the user data inputted is symbol-repeated by the symbol repeater 202. Here, the number of the symbol repetition is determined by the control signal inputted from the base station control apparatus 106. In the pilot channel, since the input data is 0, the symbol repetition is meaningless. Therefore, in the pilot signal modulation apparatus (108 in FIG. 1), the symbol repetition is not performed. In paging channel, since all carriers are modulated by the same signal, modulation apparatus (110 in FIG. 1), a data bit is repeated four times, which corresponds to the number of the carriers, in the symbol repeater 202. As a result, the outputs of the serial/parallel converter 204 are the same data bit. In traffic channel, the number of symbol repetition in dependent on the number of mobile stations in a cell. For the same data to be transmitted in two freqencies, the symbol is repeated twice in the symbol repeater 202, and for different data to be transmitted in different frequencies, the symbol repetition is repeated just once, that is, the symbol is not repeated. In addition, for the multicarrier transmission mode, the symbol is repeated four times, and therefore, the same data bit is transmitted in all frequencies.

The data repeatedly generated by the symbol repeater 202 is converted into the parallel data by the serial/parallel converter 204.

The four parallel data from the serial/parallel converter 204 are combined with the output of the spread spectrum code generator 206 by the XOR gates 208 through 208-4. The spread spectrum code generator 206 is an apparatus commonly used for the spread spectrum modulation apparatuses 108, 112-1 through 112-K.

In addition, the spread spectrum signals are combined with the output of the user code generator 210 by the combiners 212-1 through 212-4. As a result, the user signals are able to be distinguished at receiver. In symbol converters 212-1 through 212-4 (so called a symbol mapper), the value of "1" is mapped to the value of "−1", and the value of "0" is mapped to the value of "+1". The symbol-mapped signal is wave-formed by the wave forming units 214 through 214-4 controlled by the base station control apparatus. In addition, the wave-formed signal is converted into an analog signal by the digital/analog converters 216-1 through 216-4 and is inputted into the first through fourth combiners 114-1 through 114-4.

The operation that the signals modulated by the spread spectrum modulation apparatus are demodulated by the spread spectrum demodulation apparatus will be explained.

In the case when the symbol was repeated four times, and the same traffic signals are transmitted in all carriers, all the signals received in four carrier frequencies are combined. In the case when the symbol is repeated twice and thus the same traffic signals are by two carriers, the signals received with the two carrier frequencies are combined. In the case when the symbol is not repeated and thus the different traffic signals are transmitted different carriers, the signals received with each carrier frequency is separately demodulated.

The operation of the present invention in accordance with the number of the mobile station in the base station system will be explained.

For example, if the number of code chips per data bit in one carrier is 64, two codes for the pilot and the paging signals should be excluded. Therefore, if the number of the mobile stations in the cell is below 62, it is possible to distinguish the traffic signals using the orthogonal codes. Therefore, in this case, the orthogonal code is allocated to each mobile station, and it is possible to maximize the signal-to-noise gain based on the diversity of the frequency. However, in this case, in order to add a new call, another code, not the orthogonal code, should be allocated to the new mobile station. As a result, the new mobil station will be experienced a large interference from the other 62 user signals. To mitigate this effect, in this invention, we are the following exemplary strategy. If the number of the mobile stations is about 30, when a new user requests a call set-up, the symbol repetition for the new call is set to 2. As a result, the number of the code chips per data bit is increased for thereby allocating the orthogonal code instead of using non-orthogonal codes. Therefore, it is possible to increase the remaining 32 orthogonal codes to 64 orthogonal codes.

If the number of the mobile stations is continuously increased, since a new mobile station transmits two data bits based on the parallel transmission by two carriers, it is possible to control 126 mobile stations in maximum when all calls are finished by the mobile station. In the similar manner, the number of the code chips per data bit can be increased to 256.

In the case of the mobile communication system of the single carrier method, since an orthogonal code is used for different user signals, there is not a multiple access interference in a cell. However, in a mobile communication environments, a multipath interference may exist between the different paths. In this case, since the number of the multipaths is increased system, the interference due to the multipath is increased. Since the number of multipaths in the single carrier system is more than that of the multicarrier system, the multipath interference in single carrier system is larger than that of the multicarrier system. Therefore, in the case that there are a lot of users, the decrease of the signal-to-noise ratio due to the multipath interference in multicarrier system is similar to the decrease of the signal-to-noise ratio due to the decrease of the frequency diversity gain in the hybrid MC/FDM system. However, if there is a small number of users, since the multipath interference in the multicarrier system is smaller than that of the single carrier system, and the gain from the diversity of the frequency is identical to the gain from path diversity at the system of the single carrier method, the system of the multicarrier method has an excellent performance compared to the system of the single carrier method. Therefore, when the threshold value of the number of the users is determined, in the case that the system of the multicarrier CDMA/FDM hybrid is used, it is possible to obtain an excellent performance compared to the single carrier system.

As described above, in the present invention, it is possible to use orthogonal codes for distinguishing user signals in a base station of the multicarrier spread spectrum system and is possible to allocate a predetermined number of user codes which the same as the number of the orthogonal codes of the single carrier system. In view of the performance, it is possible to obtain an excellent performance compared to the single carrier system.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A base station system of a multicarrier method, comprising:

a base station control apparatus connecting with an exchange;

a pilot signal modulation apparatus for generating a spread spectrum modulated pilot signals as many as the number of carriers in accordance with a control of the base station control apparatus;

a paging signal modulation apparatus for generating a spread spectrum modulated paging signals as many as the number of carriers in accordance with a control of the base station control apparatus;

a plurality of traffic signal modulation apparatuses, each of which generates a spread spectrum modulated traffic signals as many as the number of carriers in accordance with a control of the base station control apparatus;

a plurality of combiners as many as the number of the carriers for combining input signals from the modulation apparatuses; and a radio frequency transmission apparatus for modulating the outputs from the combiners into multiple radio frequencies and transmitting the same, wherein said base station control apparatus determines the modulation mode in accordance with the number of mobile stations in a cell, and the determined modulation mode is contained into the paging signal and then is transmitted, and the traffic signal modulation apparatus is controlled in accordance with the determined modulation mode, and wherein said traffic signal modulation apparatus symbol-repeats the user data bits for a predetermined time in accordance with the modulation mode determined by the base station control apparatus and the radio frequency transmission apparatus modulates a plurality of carriers using a traffic spread spectrum signal obtained by multiplying the symbol-repeated, serial/parallel-converted user data bits as many as the carriers and the traffic pseudo noise code.

2. The system of claim 1, wherein said base station control apparatus determines a multicarrier transmission mode when the number of the mobile stations in the current cell or the average number of the mobile stations is below a predetermined value, and otherwise determines a hybrid transmission mode.

3. The system of claim 1, wherein said modulation apparatus includes:

a symbol repeating means for symbol-repeating an inputted data for a predetermined time in accordance with a control of the base station control apparatus;

a serial/parallel converting means for converting the symbol-repeated serial data into a parallel data as many as the number of the carriers; and a spread spectrum modulation means for combining a spectrum spreading code and a user code to each output of the serial/parallel conversion means and outputting a spread spectrum modulated signal.

4. The system of claim 3, wherein said symbol repeating means of the traffic signal modulation apparatus symbol-repeats the user data as many as the number of the carriers when the modulation mode determined by the base station control apparatus is a multicarrier transmission mode, and symbol-repeats the user data in accordance with the number of the symbol repetition determined by the base station control apparatus when the modulation mode is a hybrid transmission mode.

5. In a data transmission method for a multicarrier mobile communication system including a base station provided with a base station control apparatus, a pilot signal modulation apparatus, a paging signal modulation apparatus, a plurality of traffic signal modulation apparatuses, and a radio frequency transmission apparatus and a mobile station provided with a mobile station control apparatus, a pilot signal receiving apparatus and an information receiving apparatus, an improved method comprising the steps of:

a first step for determining a modulation mode in accordance with the number of the mobile stations in the current cell in the base station control apparatus;

a second step for performing a spread spectrum modulation of paging data bits including the determined modulation mode, pilot symbols and traffic data bits as many as the number of the carriers;

a third step for modulating the multiple radio frequencies carriers by the spread spectrum modulated paging signal, the pilot signal and a plurality of traffic signals and transmitting the same to the mobile station;

a fourth step in the mobile station for detecting a code phase of the received signal and an information of the carrier phases from the pilot signal; and a fifth step in the mobile station for obtaining the modulation mode from the paging signal and demodulating the received traffic signal using the modulation mode, wherein in said traffic information modulation step, the user traffic data bit is symbol-repeated for a predetermined times in accordance with the determined modulation mode, and in third step, a plurality of carriers are modulated by a traffic spread spectrum signal obtained by multiplying the serial/parallel converted data bit and the traffic pseudo noise code as many as the number of the carriers with respect to the symbol-repeated user data bits.

6. The method of claim 5, wherein in said first step, the multicarrier transmission mode is determined when the number of the mobile stations in the current cell or the average number of the mobile stations for a predetermined time is below a threshold value.

7. The method of claim 5, wherein in said traffic information modulation step, the user data is symbol-repeated as many as the number of the carriers when the modulation mode is the multicarrier transmission mode, and the user data is symbol-repeated in accordance with the number of the symbol repetition determined by the base station control apparatus when the modulation mode is a hybrid transmission mode.

8. The method of claim 5, wherein in said fifth step, the traffic data received through each carrier frequency are all symbol-combined and then demodulated when the modulation mode is a multicarrier transmission mode, and the traffic data received through a few carrier frequencies are symbol-combined and then demodulated in accordance with the number of the symbol repetitions when the modulation mode is a hybrid transmission mode or separately demodulates the traffic data received through each carrier frequency.

9. In a mobile communication system including a base station and a mobile station, said base station comprising:

a base station control means for determining a modulation mode in accordance with the number of mobile stations in a current cell, including the determined modulation mode into a paging signal and controlling a spectrum spreading modulation in accordance with the determined modulation mode;

a pilot signal modulation means for generating a spread spectrum modulated pilot signal as many as the number of the carriers in accordance with a control of the base station control means;

a paging signal modulation means for generating the spread spectrum modulated paging signal in accordance with a control of the base station control means;

a traffic signal modulation means for symbol-repeating the user data bit for a predetermined times in accordance with the modulation mode determined by the base station control means and modulating a plurality of carriers using a traffic spread spectrum signal obtained by multiplying the symbol-repeated user data bit and the serial/parallel converted data bit and the traffic pseudo noise code;

a plurality of combining means provided at many as the carriers for combining the signals inputted from the modulation means; and a radio frequency transmission means for modulating the output signals from the combining means to the multiple radio frequency;

said mobile station comprising a pilot signal receiving means for detecting a code phase and a plurality of carrier phases of the receiving signal from the pilot signal received from the base station;

an information receiving means for demodulating the paging signal and the traffic signal received from the base station; and a mobile station control means for controlling the pilot signal receiving means and the information receiving means, detecting the modulation mode used for the base station from the paging information demodulated to the information receiving means and demodulating the traffic signal using the detected phase information.

10. The system of claim 9, wherein said base station control means determines the multicarrier transmission mode when the number of the mobile stations in the current cell or the average number of the mobile stations for a predetermined period is below a predetermined threshold value, and otherwise the hybrid transmission mode is determined.

11. The system of claim 10, wherein said modulation means includes:

a symbol repeating means for symbol-repeating the data for a predetermined times in accordance with a control of the base station control means;

a serial/parallel converting means for converting the symbol-repeated serial data into a parallel data as many as the carriers; and a spread spectrum modulation means for combining the output of the serial/parallel converting means and the spread spectrum code and the user classifying code and outputting a spread spectrum modulated signal.

12. The system of claim 11, wherein said symbol repeating means of the traffic signal modulation means symbol-repeats the received user data as many as the number of the carriers when the modulation mode determined by the base station control means is the multicarrier transmission mode and symbol-repeats the received user data in accordance with the number of the symbol repetitions determined by the base station control apparatus when the modulation mode is the hybrid transmission mode.

* * * * *